INVENTOR.
ROBERT A. SCHOENLAUB
BY
Francis L. Kremblas Jr.
ATTORNEY

United States Patent Office 3,540,280
Patented Nov. 17, 1970

3,540,280
TEMPERATURE MONITORING APPARATUS
Robert A. Schoenlaub, Columbus, Ohio, assignor to The Edward Orton, Jr., Ceramic Foundation, Columbus, Ohio, a trusteeship under the will of Edward Orton, Jr.
Filed Apr. 11, 1968, Ser. No. 720,616
Int. Cl. G01k 1/14, 13/06, 13/10
U.S. Cl. 73—341                                  7 Claims

ABSTRACT OF THE DISCLOSURE

A temperature monitoring system and associated apparatus which includes a housing preferably adapted for removable attachment to a kiln car which is to pass through a tunnel kiln. A plurality of thermocouples are disposed in the housing and include a master thermocouple. A recording means and a timing means are also disposed in the housing and are operatively connected to the thermocouples to record temperature differentials between the location of the master thermocouple and the location of each of the remaining thermocouples. A plurality of conduits communicate with the housing and with externally located sources of power and cooling.

---

Figure 1:
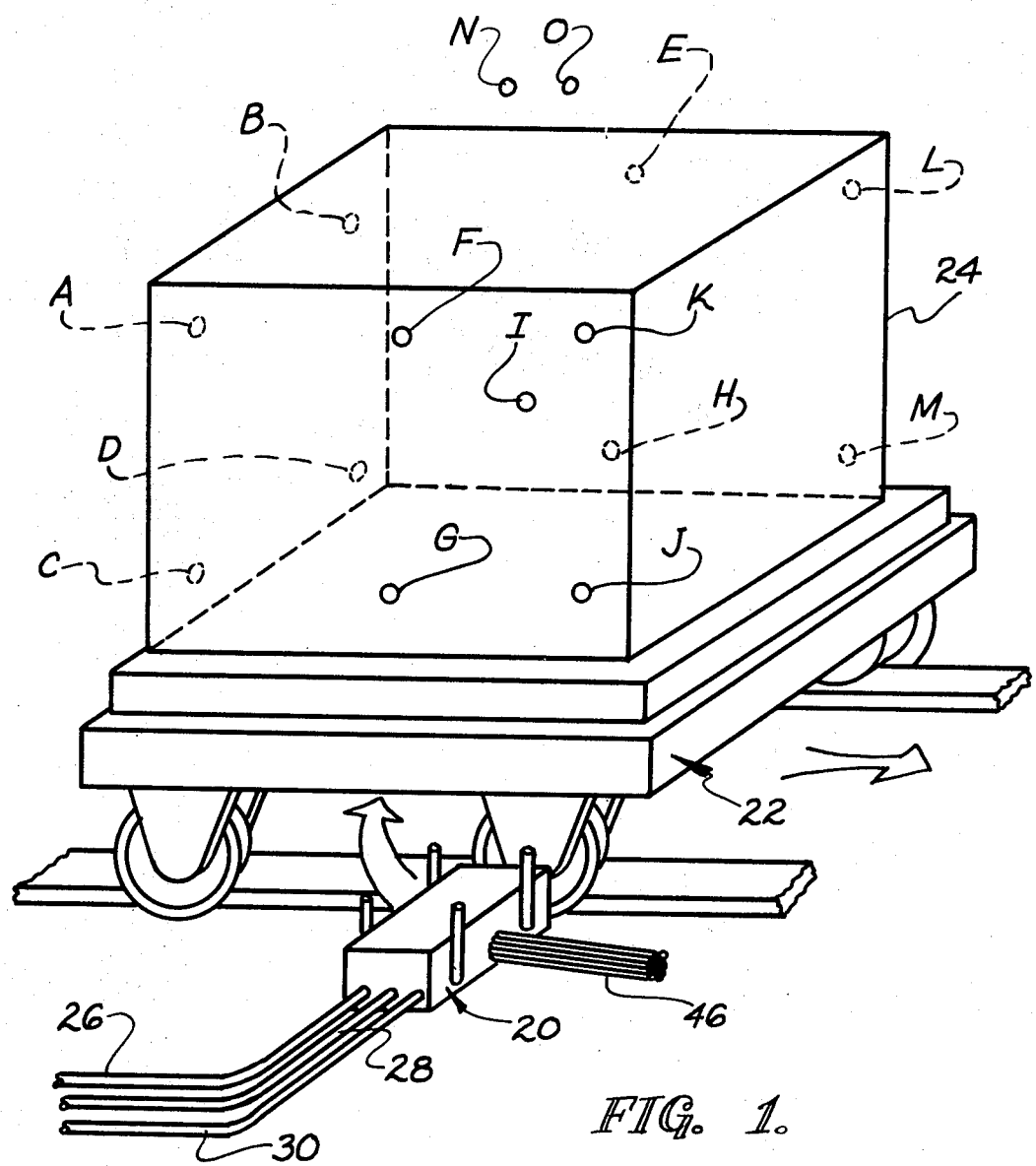

The present invention relates generally to temperature monitoring systems and particularly to an improved temperature monitoring system and apparatus for ceramic settings passing through tunnel kilns on kiln cars.

In the firing of ceramic ware in car bottom tunnel kilns which may be five hundred or more feet in length it is very desirable to obtain temperature measurements at several predetermined positions along the length of the tunnel. A temperature profile thus obtained is beneficial to the efficient operation of the process since the firing schedule may then be adjusted to reduce cracks or breaks in the ware caused by excessive shrinkage or expansion.

To those skilled in the art, an accurate temperature profile permits the adjustment of the temperature in the tunnel at various stages of firing and cooling such that the stages where excessive stress develops may be controlled to insure that the strain never exceeds the elastic limit of the ceramic ware.

Prior to the present invention, temperature information has been obtained by placing thermocouples at various positions along the tunnel, however, the construction of conventional tunnel kilns do not provide for convenient access. Further efforts in this area have been made seeking more precise measurements and greater information by imbedding thermocouples within the ceramic settings. The lead wires of these thermocouples were coiled and connected to a multipoint recorder located externally to the tunnel.

However, this is an expensive and time consuming operation and the resolution of such a recorder is too small to provide a high degree of accuracy. Further, the maximum number of monitored points is too low to give a truly adequate survey from which a reliable analysis can be made.

Further means proposed to obtain temperature information relate to the use of thermocouples in the ceramic settings with a device which telemeters by radio signal to an external recorder. However, since temperature may reach as high as 400 degrees F. beneath the kiln car the necessary equipment is very expensive.

In accordance with the present invention a temperature monitoring system is provided which possesses the following advantages:

1. The entire system is much less expensive than as prior systems and apparatus.
2. The components are relatively simple, compared to prior art devices, and are readily available and easily maintained.
3. The components may be protected from the heat of the kiln in a positive manner.
4. The accuracy of the system is greatly improved and more than adequate to obtain reliable, useful information.
5. A larger number of points may be monitored in an extremely convenient manner as compared to prior art devices.
6. The choice of points to be monitored is greatly increased to provide a more accurate survey of the temperature in the load, around the load and in various positions about the kiln car.

Therefore it is an object of the present invention to provide a temperature monitoring system of the type described which permits the accurate determination of the temperature profile of the process of firing ceramic ware in tunnel kilns in a relatively simple, easy manner.

It is another object of the present invention to provide apparatus for a temperature monitoring system which utilizes relatively low cost components which are readily obtainable and which are easily maintained.

It is still another object of the present invention to provide a temperature monitoring system of the type described wherein the components are provided with positive protection from the heat of the kiln.

It is a further object of the present invention to provide a temperature monitoring system of the type described wherein a greater number of different points in and about the ceramic setting and the kiln car may be monitored in a relatively simple and convenient manner.

Further objects and advantages of the present invention will be apparent from the following description, reference being had to the accompanying drawings wherein preferred forms of embodiments of the invention are clearly shown.

IN THE DRAWINGS

Figure 2:
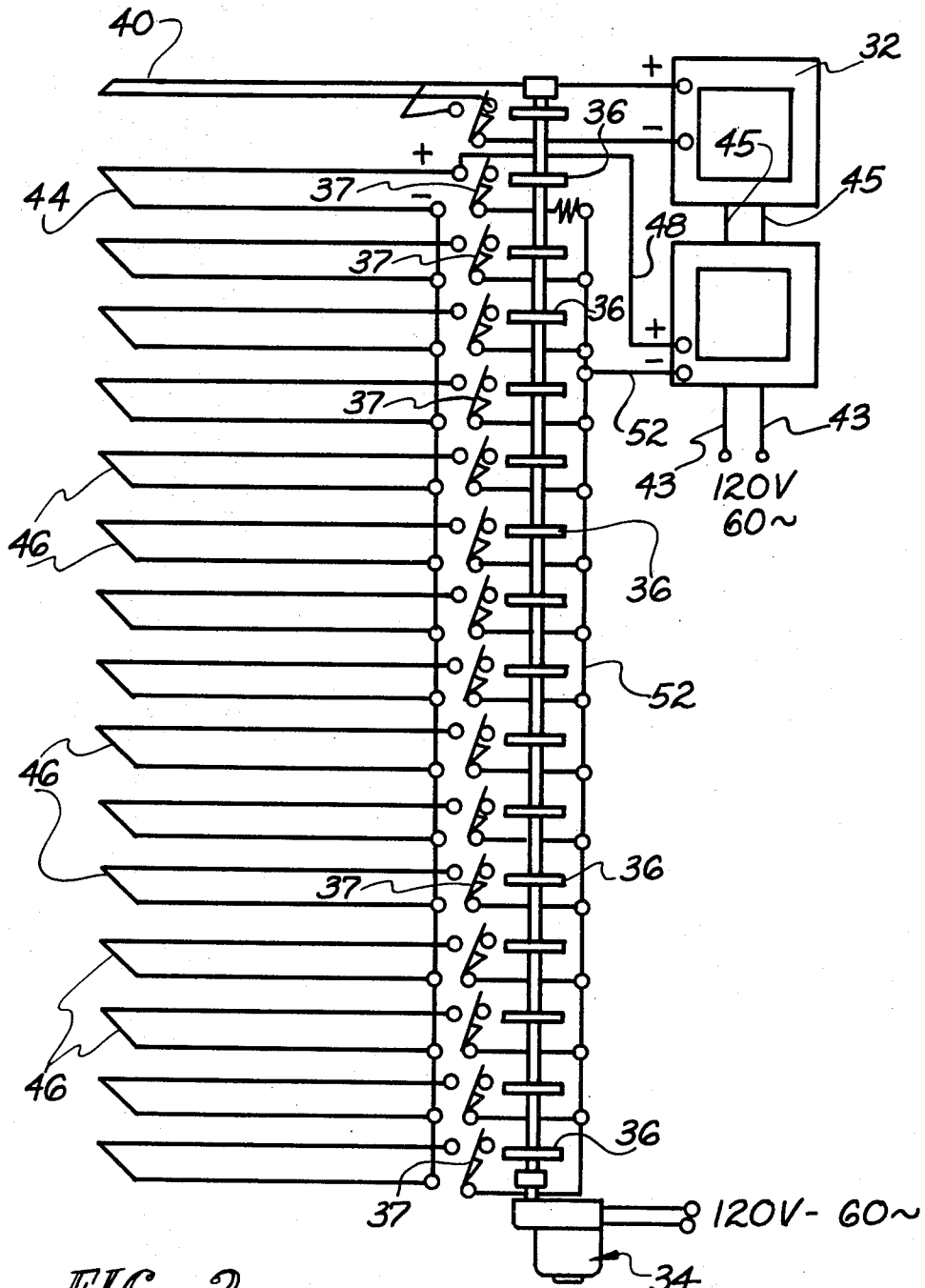
Figure 3:
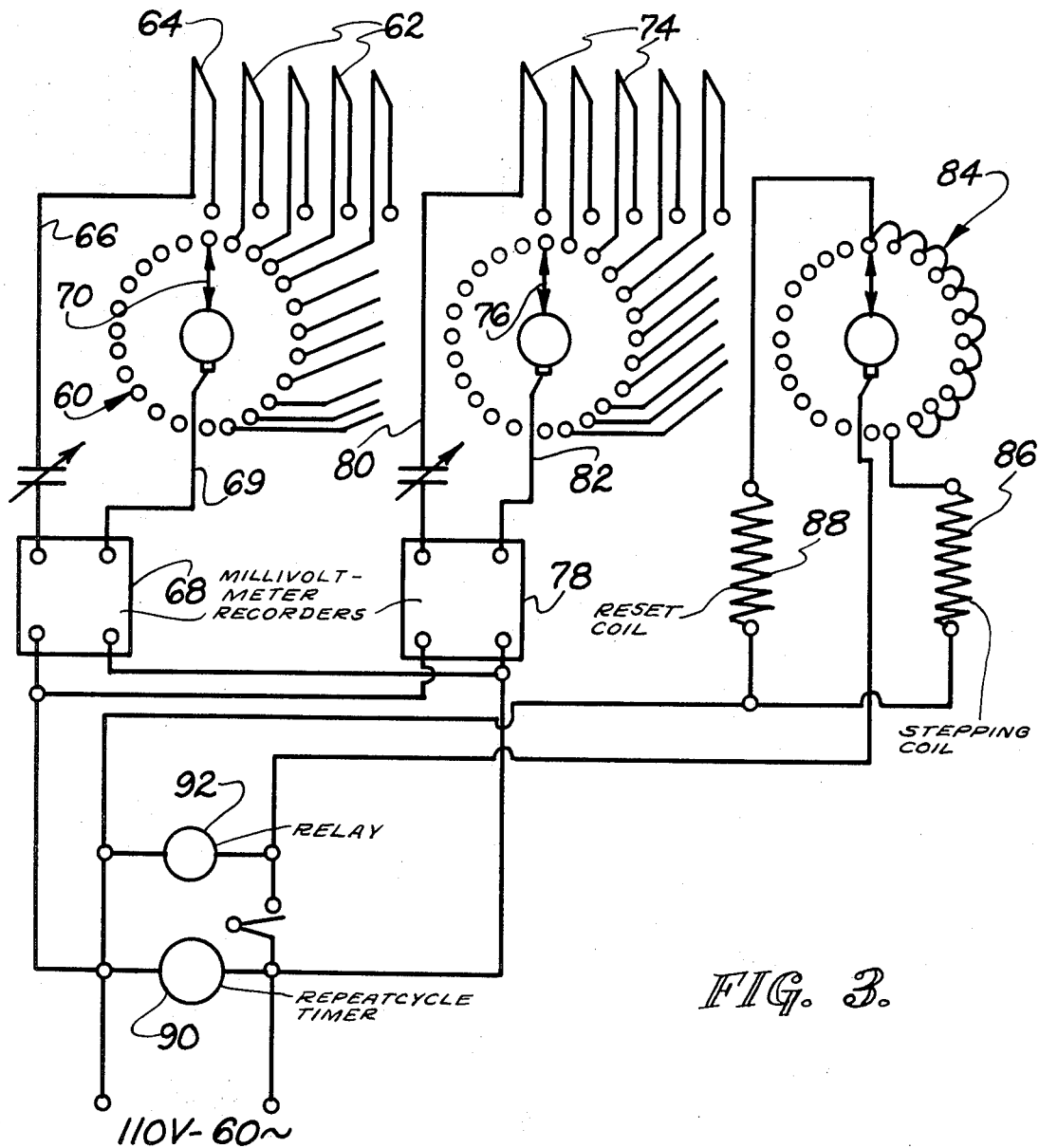

FIG. 1 is a perspective view of a conventional kiln car and an apparatus for a temperature monitoring system constructed in accordance with the present invention;

FIG. 2 is a diagrammatic view of a portion of the apparatus shown in FIG. 1 illustrating one embodiment of an electrical circuit and associated apparatus constructed in accordance with the present invention; and FIG. 3 is a diagrammatic view of a portion of the apparatus for a temperature monitoring system constructed in accordance with the present invention illustrating a modification of the electrical circuit and associated apparatus shown in FIG. 2.

Referring in detail to the drawings, apparatus for a temperature monitoring system constructed in accordance with the present invention is illustrated in FIGS. 1 and 2 and includes a housing means indicated at 20.

Housing means 20 may be removably attached to a conventional kiln car, indicated generally at 22, by any convention means, such as threaded fasteners or the like.

A setting 24 of ceramic ware is shown positioned on car 22 which will be passed through a conventional tunnel kiln, not shown, on rails 25.

Housing 20 is communicated to a source of cooling fluid, such as water for example, through intake conduit 26 and outlet conduit 28 and with a source of electrical power through a power conduit 30.

Conduits 26, 28 and 30 are preferably coiled on conventional reels which are commercially available for such purposes, and are of sufficient length to extend the length of the tunnel kiln.

Referring specifically to FIG. 2, a typical circuit is diagrammatically illustrated and includes a recorder in the form of a millivoltmeter pyrometer 32 provided with a pressure bar, not shown, and a pressure sensitive chart. The range of the chart is dictated by the particular requirement of the application. A typical range, using chromel alumel thermocouples, which would cover a major portion of ceramic firing applications would be from 0 to 2500 degrees F.

A plurality of thermocouples are provided which are actuated by a timing means in the form of a multicircuit repeat cycle timer, indicated generally at 34, which includes a plurality of cams 36 which actuate a respective one of a plurality of switches 37 and which is operatively connected to power conduit 30 by leads 38.

Thermocouple 40 is optional and the hot junction thereof may be placed in the kiln gas stream and when connected in the circuit, it would read the gas stream temperature. However other locations may be chosen to monitor case temperature, bearing journal temperature, or any other temperature that might give useful information.

Differential recorder 42, preferably is also a simple millivoltmeter pyrometer provided with a pressure bar and a pressure sensitive zero center chart.

Recorders 32 and 42 are connected to the power source, via leads 43 and 45.

A master thermocouple 44 is provided to obtain a reference temperature. One lead 48 of thermocouple 44 is connected directly to recorder 42 and the other lead 50 is sequentially connected in opposition to a respective one of a plurality of monitoring thermocouples, indicated generally at 46, via switches 37 actuated by a respective cam 36 and lead 52.

A resistance 49 is provided in the lead 52 between master thermocouple 44 and differential recorder 42 to protect the relatively short span instrument.

Since monitoring thermocouples 46 are sequentially connected in opposition to master thermocouple 44 as dictated by multicircuit repeat cycle timer 34, recorder 42 records the temperature differential between a predetermined reference point which is measured by master thermocouple 44 and a predetermined monitoring location at which a respective one of thermocouples 46 is placed.

Timing means 34 is set such that each thermocouple 46 is turned on a predetermined length of time representing a given percentage of the total time of a given full cycle and preferably a time lapse is provided between actuation of each cam 36 to separate individual readings on the recording chart.

The range of the differential recorder 42 may be adjusted according to a given application. For example, using chromel alumel thermocouples, a range of plus or minus ten millivolts represents a temperature differential of plus or minus 480 degrees F. which would cover most ceramic firing operations. However, other ranges may be used according to the individual circumstances of the particular application. It is important to point out that since temperature differentials are being recorded, the resolution of the chart may be relatively large to provide a high degree of accuracy as compared to prior methods and means.

Thermocouple 40 may be synchronized by timing means 34 with master thermocouple 44 such that, thermocouple 40 and master thermocouple 44 are measuring direct temperatures at their particular locations at the same time.

In operation, housing 20 would be preferably removably attached to kiln car 22, in any suitable manner, with conduits 26, 28 and 30 wound on reels, not shown, and connected to their respective sources or outlets.

The respective leads of thermocouples 40, 44 and 46 extend outwardly through housing 30 and would be placed in various predetermined locations in and about ceramic setting 24 and car 22. The number of thermocouples and their locations are chosen relative to the specific information sought.

Since the combustion gases from the burners move along the arch of the tunnel kiln and in the opposite direction to the movement of car 22 through the kiln, the upper portion of the setting is subjected to higher temperatures than the lower portion before the car reaches the firing zone of the tunnel. Further, since most of the burners are in the firing zone of the tunnel and disposed near the bottom of the kiln, the bottom of the setting may be subject to destructive rates of temperature rise.

Localized heating or cooling could occur around burners or due to imperfect car seals and therefore other undesirable temperature differentials may occur. Also the center and bottom of the setting may never obtain equivalent heat treatment compared to the outer portions.

Therefore it can be readily seen, that while the particular location of the monitoring points may change from one application to another, there unquestionably is a great need for information concerning a considerable number of points to obtain an adequate survey. A typical array of positions to be monitored is illustrated in FIG. 1 and designated by letters A through O.

The timing means 34 may be chosen to operate on any convenient time cycle. The respective switches 37 for monitoring thermocouples 46 are actuated according to spaced intervals of the chosen time cycle.

As the car passes through the tunnel kiln, thermocouple 40 is providing information concerning the kiln gas temperature for example, which is automatically being recorded by recorder 32. The differential recorder 42 is recording temperature differentials between the temperature at the various locations of monitoring thermocouples 46 as compared to the temperature at the location of the master thermocouple 44.

In this manner, an accurate and comprehensive temperature porfile is obtained which permits the operator to make adjustments relative to the speed of the kiln car at various stages in the tunnel or adjust the heat or cooling air to which the ceramic setting is subjected. Upon the information gathered, a most efficient time-temperature schedule may be formulated for additional settings to be fired.

Now referring specifically to FIG. 3, another embodiment of the present invention is illustrated. The major difference between the embodiment shown in FIG. 2 and the one shown in FIG. 3 relates to the use of a stepping relay having a plurality of levels or decks instead of a multi-circuit repeat cycle timer.

A first deck of a stepping relay, having 30 contacts per deck, indicated generally at 60, functions as a timing means for sequentially connecting each one of a plurality of thermocouples, indicated generally at 62, to a master thermocouple 64 and a differential recorder 68.

Master thermocouple 64 is connected in a similar manner to oppose the remaining monitoring thermocouples 62 as previously described in the embodiment shown in FIG. 2.

One lead 66 of master thermocouple 64 is connected to one input of a differential recorder 68 of the same type as recorder 42 and another lead 69 connects the stepping relay switch 70 with the other input of recorder 68.

The various hot junctions of thermocouples 62 are positioned at various locations in and about setting 24 in a similar manner as previously described.

A second deck of the stepping relay, indicated generally at 72, includes a plurality of thermocouples, indicated generally at 74, which are connected directly to switch 76. One lead of each thermocouple is connected to temperature recorder 78 via lead 80 and the other lead of each thermocouple is sequentially connected to recorder 78 via switch 76 and lead 82. In this manner thermocouples 74 yield direct temperature measurement rather than temperature differentials. However, it is important to point out that thermocouples 74 may be connected to obtain temperature differentials if such information is desired without departing from the spirit of the present invention.

A third deck of the stepping relay indicated generally at 84, operates a reset coil 86 and a stepping coil 88. At any predetermined point a new cycle may then be initiated to begin a new series of measurements.

A simple repeat cycle timer 90 is included to dictate the time interval between each reading. For example, if a stepping relay having thirty contacts in the first deck is used and twenty-five different points are to be monitored, a thirty second timer would cover the twenty-five points in fifteen minutes with five blank points used for indexing.

Usually no more than ten different points would need to be monitored on the second deck and the extra points could be used for indexing if the chart speeds of recorders 68 and 78 are equal.

To facilitate reading of the monitored points on the charts of the recorders, a time delay relay 92 may be included to provide a zero signal for a short interval between each measurement recorded.

Of course a repeat cycle timer having either longer or shorter time intervals could be chosen wtihout departing from the spirit of the present invention. The time interval for each measurement is determined by the particular circumstances of the application and the desired number of measurements to be obtained for a given full cycle.

Stepping relays are now commercially available which are capable of operation at temperature up to 212 degrees F. Therefore only one cooling conduit would be required since air would provide adequate cooling. However, if air is used for cooling, it may be desirable to remove the recorders from housing 20 to a position external to the kiln. The embodiment described in FIG. 3 then would require four conduits, not shown, instead of the three required for the embodiment described in FIG. 2. These conduits would be a single cooling conduit, a power conduit to the relay and a two wire cable to each level used. However, at most only four reels would be required for the measurement of fifty or more different locations in and about the ceramic setting.

It is important to point out that if improved stepping relays are made available which would operate at 400 degrees F. then the air cooling conduit and one reel could be eliminated.

It also should be understood that in relatively simple systems all measurements could be obtained from a single deck and this would require only three conduits and three reels.

From the foregoing description, it should be apparent that the monitoring system of the present invention provides a unique arrangement of relatively simple components which yield more information in a more efficient and less expensive manner than prior methods and means.

While the forms of embodiments of the present invention as herein disclosed constitute preferred forms, it is to be understood that other forms might be adopted.

I claim:

1. In a temperature monitoring system for ceramic settings and kiln cars passing through a tunnel kiln the combination of a housing detachably connected to a kiln car; a source of electrical power communicating with said housing; a plurality of monitoring thermocouples having their respective hot junctions disposed at predetermined locations in and about the ceramic setting and kiln car and their respective leads extending into said housing; a master thermocouple having its hot junction disposed at a predetermined reference location outside of said housing and leads from the hot junction of said master thermocouple extending into said housing; recording means operatively connected to said master thermocouple and responsive to electrical signals proportional to temperature; and timing switch means disposed in said housing and operatively connected to said source of electrical power, to said recording means and to the leads of said monitoring thermocouples for selectively connecting each of said monitoring thermocouples in opposing relationship to said master thermocouple at predetermined spaced intervals.

2. The system defined in claim 1 wherein said timing means includes a multicircuit repeat cycle timer.

3. The system defined in claim 1 wherein said timing means includes a multicontact stepping relay.

4. An aparatus for monitoring temperatures in and about ceramic settings and kiln cars passing through a tunnel kiln comprising, in combination, a housing detachably mounted on a kiln car; a plurality of monitoring thermocouples having their respective cold junctions disposed in said housing and including leads extending outwardly from said housing to their respective hot junctions for selective placement in predetermined locations which are to be monitored; a master reference thermocouple having its cold junction disposed in said housing and its hot junction disposed at a predetermined reference location outside of said housing; recording means responsive to an electrical signal operatively connected to one lead of said reference thermocouple; timing switch means mounted in said housing and operatively connected to said recording means and to said reference thermocouple and said monitoring thermocouples for successively connecting certain of said monitoring thermocouples in differential relationship with said reference thermocouple to record signals representing temperature differentials between said reference location and said predetermined locations to be monitored; and a source of electrical power communicating with said housing and operatively connected to said recording means and said timing means.

5. The system defined in claim 4 including an additional thermocouple having its cold junction disposed in said housing and including leads extending from said housing to its hot junction disposed in a preselected location, said thermocouple being operatively connected to said timing means and to a second recording means for recording directly temperatures at said preselected location at predetermined spaced intervals.

6. The apparatus defined in claim 4 wherein said timing means includes a multicircuit repeat cycle timer.

7. The apparatus defined in claim 4 wherein said timing means includes a multicontact stepping relay.

References Cited

UNITED STATES PATENTS

| | | | |
|---|---|---|---|
| 2,549,401 | 4/1951 | Stein et al. | 73—341 XR |
| 2,606,808 | 8/1952 | Brown | 73—341 XR |
| 2,907,209 | 10/1959 | Wack | 73—341 |
| 3,077,775 | 2/1963 | Hoffman | 73—341 |
| 3,192,770 | 7/1965 | Bash | 73—341 |

LOUIS R. PRINCE, Primary Examiner

F. SHOON, Assistant Examiner

U.S. Cl. X.R.

73—343